US005236768A

United States Patent [19]

Fujii et al.

[11] Patent Number: 5,236,768

[45] Date of Patent: Aug. 17, 1993

[54] THERMAL TRANSFER RECORDING SHEET

[75] Inventors: Toshio Fujii; Yutaka Kawai; Yoshio Shimizu, all of Kurashiki, Japan

[73] Assignee: Mitsubishi Kasei Corporation, Tokyo, Japan

[21] Appl. No.: 842,519

[22] Filed: Feb. 27, 1992

[30] Foreign Application Priority Data

Feb. 27, 1991 [JP] Japan .................................... 3-33146

[51] Int. Cl.[5] .................................................. B32B 9/00

[52] U.S. Cl. .................................... 428/195; 428/206; 428/323; 428/326; 428/327; 428/402; 428/405; 428/407; 428/446; 428/913; 428/914

[58] Field of Search ............... 428/206, 195, 323, 403, 428/407, 913, 914, 326, 327, 402, 405, 446

[56] References Cited

U.S. PATENT DOCUMENTS 4,985,399 1/1991 Matsuda et al. .................... 428/206
4,988,667 1/1991 Long .................................. 503/227

FOREIGN PATENT DOCUMENTS 0160098 11/1985 European Pat. Off. .
0348990 1/1990 European Pat. Off. .
0401878 12/1990 European Pat. Off. .

OTHER PUBLICATIONS

Patent Abstracts of Japan, vol. 11, No. 168, (M-594) [2615], May 29, 1987, & JP-A-62 001 580, Jan. 7, 1987, Y. Hotta, et al., "Heat-Sensitive Transfer Recording Ink Sheet".

Patent Abstracts of Japan, vol. 9, No. 300, (M-433) [2023], Nov. 27, 1985, & JP-A-60 137 693, Jul. 22, 1985, K. Koshizuka et al., "Thermal Transfer Recording Medium".

Patent Abstracts of Japan, vol. 13, No. 373, (M-861) [3721], Aug. 18, 1989, & JP-A-1 127 380, May 19, 1989, T. Kawakami, et al., "Thermal Recording Transfer Body and Production Thereof".

Patent Abstracts of Japan, vol. 13, No. 538, (M-900) [3886], Nov. 30, 1989, & JP-A-1 221281, Sep. 4, 1989, S. Yamaguchi, et al., "Thermal Transfer Ink Sheet and Heat-Resistant Film Used For The Same".

*Primary Examiner*—Patrick J. Ryan
*Assistant Examiner*—W. Krynski
*Attorney, Agent, or Firm*—Oblon, Spivak, McClelland, Maier & Neustadt

[57] ABSTRACT

A thermal transfer recording sheet comprising a base film, a heat transferable ink layer formed on one side of the base film and a heat resistant lubricating layer formed on the other side of the base film, wherein the heat resistant lubricating layer contains a modified silicone oil having a viscosity of not lower than 600 cst, an average modified amount of which is not more than 1,500 g per mol of a modifying group.

11 Claims, No Drawings

THERMAL TRANSFER RECORDING SHEET

The present invention relates to a thermal transfer recording sheet. Particularly, it relates to a thermal transfer recording sheet which is advantageously useful for color recording of television images or for color recording by terminals of office equipments such as facsimile machines, printers or copying machines.

In the thermal sensitive transfer recording system, an image-receiving sheet is overlaid on the ink-coated side of a thermal transfer recording sheet having a colorant-containing ink coated thereon, and recording is conducted by heating the rear side of the thermal transfer recording sheet by a thermal head so that the colorant in the thermal transfer recording sheet is thereby transferred to the image-receiving sheet. Such a system includes a wax transfer recording system using a heat-meltable ink and a dye transfer recording system using a sublimable dye-containing ink.

In a thermal sensitive transfer recording system of this type, the thermal transfer recording sheet is heated to a high temperature by a thermal head. If the heat resistance of the base film of the thermal transfer recording sheet is inadequate, the base film is likely to fuse and stick to the thermal head. By such fusion, a noise so-called a sticking noise is likely to be generated, or a dust is likely to deposit on the thermal head. If the fusion is more remarkable, running of the thermal head will be difficult, and recording will no longer be conducted. Therefore, it has been proposed to provide protective films of various heat resistant resins in order to improve the heat resistance of the base film (Japanese Unexamined Patent Publications No. 7467/1980 and No. 74195/1982), or to add heat resistant fine particles, lubricants or surfactants to such protective layers in order to further improve the running properties (Japanese Unexamined Patent Publications No. 146790/1980, No. 155794/1981 and No. 129789/1982).

However, in the recent recording method of this system, a higher energy than before is imparted to the thermal head for high speed recording, and a larger load is imparted to the thermal transfer recording sheet. Therefore, with the methods disclosed in the above Patent Publications, it is difficult to obtain adequate running properties of a thermal head. Especially in the case of the thermal transfer recording sheet for the dye transfer recording system using a sublimable dye, a high energy is required at the time of recording as compared with the thermal transfer recording sheet for the wax transfer recording system using a heat-meltable ink, and adequate running properties of a thermal head can not be obtained with the thermal transfer recording sheet treated by the conventional methods.

The present inventors have conducted extensive studies aiming at improving the running properties of a thermal head, and as a result, have found it possible to obtain a thermal transfer recording sheet excellent in running properties of the thermal head even during high energy-recording by forming a heat resistant lubricating layer containing a specific lubricating agent on a base film. The present invention has been accomplished on the basis of this discovery. Thus, an object of the present invention is to provide a thermal transfer recording sheet having a heat resistant lubricating layer for preventing fusion to a thermal head and for improving the running properties of the thermal head.

The object of the present invention can be achieved by providing a thermal transfer recording sheet comprising a base film, a heat transferable ink layer formed on one side of the base film and a heat resistant lubricating layer formed on the other side ,of the base film, wherein the heat resistant lubricating layer contains a modified silicone oil having a viscosity of at least 600 cst at 25° C., an average modified amount of which is not more than 1,500 g per mol of a modifying group.

Hereinafter, the present invention is further explained in more details.

Examples of a modified silicone oil used in the present invention include epoxy-modified, carboxyl-modified, polyether-modified, phenol-modified, amino-modified, higher fatty ester-modified, alkyl-modified, alkoxy-modified, methacryl-modified or carbinol-modified silicone oils. Among them, an epoxy-modified silicone oil or a carboxyl-modified silicone oil is particularly preferable.

If the average modified amount of the modified silicone oil is larger than 1,500 g per mol of a modifying group, the compatibility of the silicone oil with a heat resistant resin becomes poor and consequently the modified silicone oil is unevenly present in the layer so that a thermal head can not run smoothly during heat transfer recording. It is therefore essential for the present invention that the modified amount of the modified silicone oil should be not more than 1,500 g, preferably from 400 to 1,100 g, more preferably from 420 to 1,000 g per mol of a modifying group.

Also, if the viscosity of the modified silicone oil is less than 600 cst at 25° C., the oil film strength of the silicone oil on the surface of the heat resistant lubricating layer is poor and consequently the thermal head can not run smoothly during heat transfer recording since the resistance to the shear action of the thermal head is poor. It is therefore essential for the present invention that the viscosity of the modified silicone oil should be at least 600 cst, preferably at least 800 cst, at 25° C.

Heretofore, a heat resistant lubricating layer containing a modified silicone oil is disclosed in Japanese Unexamined Patent Publications No. 33684/1987, No. 8086/1990 (corresponding to U.S. Pat. No. 4,782,041), No. 8087/1990 (corresponding to U.S. Pat. No. 4,892,860), No. 137977/1990 and No. 86595/1991.

However, the modified silicone oils used in these prior arts, for example an amino-modified silicone oil "SF8417" (modified amount: 1,800 g/mol, viscosity: 1,200 cst, manufactured by Toray Silicone K.K.) used in the Example of Japanese Unexamined Patent Publication No. 86595/1991, are outside of the modified amount range and the viscosity rang as claimed in the present invention. Thus, the essential feature of the present invention is to use a modified silicone oil having predetermined specific physical properties, and the aimed effect of the present invention can be achieved only by using the modified silicone oil having the predetermined specific physical properties.

The heat resistant lubricating layer used in the present invention may be a layer comprising the above-mentioned modified silicone oil alone, but is preferably a layer comprising the above-mentioned modified silicone oil and a binder resin in combination.

A heat resistant resin is generally used as a binder resin, examples of which include a cellulose type resin such as ethyl cellulose, hydroxyethyl cellulose and cellulose acetate, a vinyl type resin such as polyvinyl alcohol, polyvinyl acetate and polyvinyl butyral, a radiation-curable resin such as polyester acrylate, epoxy acrylate and polyol acrylate, a phenoxy resin, a polycarbonate resin and the like. Among them, an epoxy acrylate type resin is preferable. Since the modified silicone oil used in the present invention has a good compatibility with these binder resins, a heat resistant lubricant layer having a uniformly coated surface can be formed, thereby enabling a satisfactory heat transfer recording having uniformly printed images. The content of the modified silicone oil is preferably from 0.1 to 20% by weight on the basis of the weight of the resin.

In addition to the above components, the heat resistant lubricating layer used in the present invention may further contain heat resistant fine particles which reduce the friction coefficient between the heat transfer recording sheet and a thermal head, thereby favorably facilitating the movement of the heat transfer recording sheet during recording. Examples of the fine particles used include carbon, molybdenum disulfide, silica, alumina, titanium oxide, aluminum carbonate, ethylene tetrafluoride resin, polyimide resin, polybenzoguanamine resin, silicone resin and other inorganic and organic various fine particles. Among then, silicone resin or silica is particularly preferable.

The particle size of the heat resistant fine particles is generally from 0.01 to 5 μm, preferably from 0.5 to 5 μm, and the shape of the particle may be an indeterminate form but is preferably spherical. The amount of the particles added is generally from 0.5 to 50% by weight on the basis of the weight of the binder resin.

The above-mentioned heat resistant lubricating layer may be coated by various methods, examples of which include coating methods using a gravure coater, a reverse roll coater, a wire bar coater, an air doctor coater or the like as described in "coating system" written by Yuji Harasaki (1979, published by Maki Shoten).

The thickness of the heat resistant lubricating layer formed on a base film is usually from 0.1 to 10 μm, preferably from 0.3 to 5 μm.

The base film in the heat transfer sheet of the present invention may be a polyethylene terephthalate film, a polyamide film, a polyaramide film, a polyimide film, a polycarbonate film, a polyphenylene sulfide film, a polysulfone film, a cellophane film, a triacetate film or a polypropylene film. Among them, a polyethylene terephthalate film is preferred from the viewpoint of the mechanical strength, the dimensional stability, the heat resistance and the price. A biaxially stretched polyethylene terephthalate film is more preferred. The thickness of such a base film is preferably from 1 to 30 μm, more preferably from 2 to 15 μm.

The ink layer of the thermal transfer recording sheet of the present invention may be formed by a usual method. For example, in the case of the sublimation type thermal transfer recording sheet, a sublimable dye and a heat resistant binder resin may be dissolved or dispersed in a suitable solvent to obtain an ink, and this ink is coated on the base film, followed by drying. In the case of the melting thermal transfer recording sheet, a coloring matter such as a pigment or a dye is dissolved or dispersed in a heat-meltable substance, if necessary, by means of a solvent, to obtain an ink, and this ink is coated on the base film, followed by drying.

As the sublimable dye to be used for the above sublimation type thermal transfer recording sheet, non-ionic azo dyes, anthraquinone dyes, azomethine dyes, methine dyes, indoaniline dyes, naphthoquinone dyes, quinophthalone dyes or nitro dyes may be mentioned. As the binder resin, a polycarbonate resin, a polysulfone resin, a polyvinylbutyral resin, a phenoxy resin, a polyarylate resin, a polyamide resin, a polyaramide resin, a polyimide resin, a polyetherimide resin, a polyester resin, an acrylonitrile-styrene resin as well as cellulose resins such as acetyl cellulose, methyl cellulose and ethyl cellulose, may, for example, be mentioned. As the solvent, an organic solvent such as toluene or xylene, a ketone solvent such as methyl ethyl ketone, methyl isobutyl ketone or cyclohexanone, an ester solvent such as ethyl acetate or butyl acetate, an alcohol solvent such as isopropanol, butanol or methyl cellosolve, a halogenated solvent such as methylene chloride, trichloroethylene or chlorobenzene, an ether solvent such as dioxane or tetrahydrofuran, or an amide solvent such as dimethylformamide or N-methylpyrrolidone, may be employed.

As the colorant to be used for the melting type thermal transfer recording sheet, the pigment includes, for example, an inorganic pigment such as carbon black, and various organic pigments of azo type or condensed polycyclic type, and the dye includes, for example, acidic dyes containing sulfonic acid groups, basic dyes, metal complex dyes and oil soluble dyes. Further, as the heat-meltable substance, a solid or semi-solid substance having a melting point of from 40° to 120° C. is preferred, such as carnauba wax, montan wax, microcrystalline wax, Japan wax or fat-type synthetic wax. As the solvent, those mentioned above with respect to the sublimation type thermal transfer recording sheet, may be employed.

To the above described various inks, in addition to the above described components, various additives such as organic or inorganic non-sublimable fine particles, dispersants, antistatic agents, blocking-preventing agents, defoaming agents, antioxidants and viscosity controlling agents, may be incorporated, as the case requires.

Coating of such an ink may be conducted by the same methods as described above with respect to the coating of the heat resistant lubricating layer. The thickness of the coated film is preferably from 0.1 to 5 μm as the dried film thickness.

Further, in the production of the recording sheet of the present invention, corona treatment may be applied to the surface of the base film in order to improve the adhesion of the base film and the layers formed thereon as described above, or primer coating treatment may be conducted by means of a resin such as a polyester resin, a cellulose resin, a polyvinyl alcohol, a urethane resin or a polyvinylidene chloride.

The thermal transfer recording sheet of the present invention is particularly suitable for the dye transfer recording system using a sublimable dye since a base film does not stick to a thermal head by fusion and the recording sheet is not broken even during high energy recording. Moreover, the thermal head runs smoothly without making a sticking sound nor depositing a dust thereon due to fusion, thus achieving a satisfactory transfer recording of good image quality.

Now, the present invention will be described in further detail with reference to Examples. However, it should be understood that the present invention is by no means restricted by such specific Examples. In these Examples, "parts" means "parts by weight".

EXAMPLE 1

(a) Preparation of a Thermal Transfer Recording Sheet

Using a biaxially stretched polyethylene terephthalate film (thickness: 4 μm) as a base film, a coating solution having the composition as shown in the following Table 1 was coated in a wet film thickness of about 12 μm on one side of the film, then dried and treated by a high pressure mercury lamp with an energy of 120 W/cm with a distance between the mercury lamp and the film being 115 mm under an irradiation energy of 120 mJ/cm$^2$ for a curing reaction to form a heat resistant lubricating layer.

TABLE 1

| Composition of the coating solution | | |
|---|---|---|
| (1) Carboxy group-modified silicone oil | *956B (tradename, manufactured by Toray Silicone K.K.) | 0.1 part |
| (2) Dipentaerythritol hexaacrylate type compound | KAYARAD DPHA (tradename, manufactured by Nippon Kayaku K.K.) | 1.2 parts |
| (3) Epoxy acrylate type compound | "RIPOXY SP-1509" (tradename, manufactured by Showa Kobunshi K.K.) | 2.8 parts |
| (4) Photopolymerization initiator | **"Darocure 1173" (tradename, manufactured by Merck Co.) | 0.2 part |
| (5) Ethyl acetate | | 30 parts |
| (6) Isopropyl alcohol | | 15 parts |

Note:
*Modified amount = 950, Viscosity = 3,353 cst
**Darocure ® 1173: 2-hydroxy-2-methyl-1-phenyl-propan-1-one

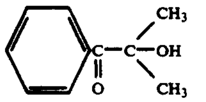

On the back side of the heat resistant lubricating layer of the above film, an ink comprising 5 parts of a sublimable dye (C.I. Solvent Blue 95), 10 parts of a polysulfone resin and 85 parts of chlorobenzene, was coated and dried to form an ink layer having a thickness of about 1 μm, to obtain a thermal transfer recording sheet.

(b) Preparation of an Image-receiving Sheet

A liquid comprising 10 parts of a saturated polyester resin ("TR-220", tradename, manufactured by Nippon Gosei K.K.), 0.5 part of an amino-modified silicone ("KF-393", tradename, manufactured by Shin-Etsu Kagaku Kogyo K.K.), 15 parts of methyl ethyl ketone and 15 parts of xylene, was coated on a synthetic paper ("YUPO FPG 150", tradename, manufactured by Oji Yuka K.K.) by a wire bar, then dried (dried film thickness: about 5 μm) and further subjected to heat treatment in an oven at 100° C. for 30 minutes to obtain an image-receiving sheet.

(c) Results of the Transfer Recording

The recording sheet and the image-receiving sheet prepared as described above, were put together so that the ink layer of the recording sheet was in contact with the resin-coated side of the image-receiving sheet, and an electric power of 0.4 W/dot was applied to the heat resistant layer side of the recording sheet for 10 msec by a thermal head having a heat generating resistor density of 8 dot/mm to conduct transfer recording of 200 cm at a density of 8 lines/mm. As a result, the sheet ran smoothly without a sticking noise and without fusion or sticking of the sheet to the head, to obtain an excellent transfer record.

EXAMPLES 2 to 5

Various thermal transfer recording sheets were prepared in the same manner as in Example 1, except that various silicone oils as shown in Table 2 were used.

Using each transfer recording sheet thus obtained and an image-receiving sheet prepared in the same manner as in Example 1, transfer recording was conducted in the same manner as in Example 1. As a result, in each case, the sheet ran smoothly without a sticking noise or without fusion or sticking of the sheet to the thermal head, to obtain an excellent transfer recording.

TABLE 2

| Example No. | Silicone oil | Tradename | Modified amount (g) | Viscosity (cst) | Maker |
|---|---|---|---|---|---|
| 2 | Carboxyl group-modified | 956D | 700 | 1,230 | Toray Silicone K.K. |
| 3 | Epoxy group-modified | 952 | 860 | 1,610 | Toray Silicone K.K. |
| 4 | Epoxy group-modified | 952F | 480 | 3,190 | Toray Silicone K.K. |
| 5 | Epoxy group-modified | BX16-862 | 850 | 2,400 | Toray Silicone K.K. |

EXAMPLE 6

A thermal transfer recording sheet was prepared in the same manner as in Example 1, except that 0.8 part of fine silica particles ("Aerosil R972", tradename, manufactured by Nippon Aerosil K.K.) and 0.4 part of spherical silicone particles ("Tospearl 120", tradename, manufactured by Toshiba Silicone K.K.) were added to the coating solution of Example 1.

Using the transfer recording sheet thus obtained and an image-receiving sheet prepared in the same manner as in Example 1, transfer recording was conducted in the same manner as in Example 1. As a result, the sheet ran smoothly without a sticking noise or without fusion or sticking of the sheet to the thermal head, thus achieving an excellent transfer recording. After the recording, the surface of the thermal head was inspected, and no deposition was observed.

COMPARATIVE EXAMPLE 1

A thermal transfer recording sheet was prepared in the same manner as in Example 1, except that in the coating solution of Example 1, the modified silicone oil was omitted. Using the thermal transfer recording sheet thus obtained, transfer recording was conducted in the same manner as in Example 1.

As a result, a sticking noise was substantial during recording, and the sheet did not run smoothly during recording.

COMPARATIVE EXAMPLES 2 to 4

Various thermal transfer recording sheets were prepared in the same manner as in Example 1, except that in the coating solution of Example 1, the modified silicone oil was replaced respectively by the silicone oils as shown in the following Table 3. Using these thermal transfer recording sheet, transfer recording was conducted in the same manner as in Example 1.

As a result, in the case of Comparative Example 2, the coated surface was satisfactory, but a small sticking noise was caused and the sheet did not run smoothly during recording. In the case of Comparative Example 3, a sticking noise was not caused but the coated surface was a dot-like uneven surface and the sheet did not run smoothly during recording. In the case of Comparative Example 4, a sticking noise was not caused, but the coated surface was a dot-like uneven surface and the sheet did not run smoothly during recording. Moreover, the transfer-recorded image was not even and had light and shade.

TABLE 3

| Comparative Example No. | Silicone oil | Tradename | Modified amount (g) | Viscosity (cst) | Maker |
|---|---|---|---|---|---|
| 2 | Epoxy group-modified | 952C | 1,170 | 410 | Toray Silicone K.K. |
| 3 | Epoxy group-modified | 952B | 1,620 | 720 | Toray Silicone K.K. |
| 4 | Carboxy group-modified | X-22-162C | 2,330 | 207 | Shin-Etsu Kagaku Kogyo K.K. |

We claim:

1. A thermal transfer recording sheet comprising a base film, a heat transferable ink layer formed on one side of the base film and a heat resistant lubricating layer formed on the other side of the base film, wherein the heat resistant lubricating layer contains a modified silicone oil having a viscosity of at least 600 cst at 25 ° C. and wherein the weight of the modified silicone oil per mole of modifying group is not more than 1,500 g/mole.

2. The thermal transfer recording sheet according to claim 1, wherein the modified amount of the modified silicone oil is from 400 g to 1,100 g per mol of the modifying group.

3. The thermal transfer recording sheet according to claim 1, wherein the viscosity of the modified silicone oil is at least 800 cst at 25° C.

4. The thermal transfer recording sheet according to claim 1, wherein the heat resistant lubricating layer comprises at least the modified silicone oil and a binder resin.

5. The thermal transfer recording sheet according to claim 4, wherein the content of the modified silicone oil is from 0.1 to 20% by weight on the basis of the weight of the binder resin.

6. The thermal transfer recording sheet according to claim 4, wherein the binder resin is at least one resin selected from the group consisting of cellulose type resin, radiation-curable resin, phenoxy resin and polycarbonate resin.

7. The thermal transfer recording sheet according to claim 1, wherein the modified silicone oil is at least one member selected from the group consisting of epoxy-modified silicone oil, carboxyl-modified silicone oil, polyether-modified silicone oil, phenol-modified silicone oil, amino-modified silicone oil, higher fatty ester-modified silicone oil, alkyl-modified silicone oil, alkoxy-modified silicone oil, methacryl-modified silicone oil and carbinol-modified silicone oil.

8. The thermal transfer recording sheet according to claim 7, wherein the modified silicone oil is epoxy-modified silicone oil or carboxyl-modified silicone oil.

9. The thermal transfer recording sheet according to claim 1, wherein the heat resistant lubricating layer further contains heat resistant fine particles.

10. The thermal transfer recording sheet according to claim 9, wherein the heat resistant fine particles are at least one member selected from the group consisting of carbon, molybdenum disulfide, silica, alumina, titanium oxide, aluminum carbonate, ethylene tetrafluoride resin, polyimide resin, polybenzoguanamine resin and silicone resin.

11. The thermal transfer recording sheet according to claim 10, wherein the heat resistant fine particles are silicone resin fine particles or silica fine particles.

* * * * *